(12) United States Patent
Manzoni

(10) Patent No.: US 8,967,545 B2
(45) Date of Patent: Mar. 3, 2015

(54) MICROSATELLITE COMPRISING A PROPULSION MODULE AND AN IMAGING DEVICE

(76) Inventor: Giulio Manzoni, Singapore (SG)

( * ) Notice: Subject to any disclaimer, the term of this patent is extended or adjusted under 35 U.S.C. 154(b) by 687 days.

(21) Appl. No.: 13/133,591

(22) PCT Filed: Dec. 10, 2008

(86) PCT No.: PCT/SG2008/000471
§ 371 (c)(1),
(2), (4) Date: Jun. 8, 2011

(87) PCT Pub. No.: WO2010/068174
PCT Pub. Date: Jun. 17, 2010

(65) Prior Publication Data
US 2011/0240801 A1    Oct. 6, 2011

(51) Int. Cl.
B64G 1/40      (2006.01)
B64G 1/22      (2006.01)
B64G 1/00      (2006.01)
F02K 99/00     (2009.01)
B64G 1/10      (2006.01)
B64G 1/26      (2006.01)

(52) U.S. Cl.
CPC .............. *F02K 99/00* (2013.01); *B64G 1/1021* (2013.01); *B64G 1/26* (2013.01); *B64G 1/402* (2013.01)
USPC ................... 244/171.1; 244/158.1; 244/172.2

(58) Field of Classification Search
CPC ............. B64G 1/10; B64G 1/40; B64G 1/402
USPC ...................... 244/158.1, 171.1, 172.2, 172.3; 220/560.11
See application file for complete search history.

(56) References Cited

U.S. PATENT DOCUMENTS

| | | | |
|---|---|---|---|
| 3,265,350 A | 8/1966 | Yount et al. | |
| 5,716,030 A * | 2/1998 | LaFiandra et al. | 244/158.1 |
| 6,131,858 A | 10/2000 | Dethienne et al. | |
| 6,539,703 B1 | 4/2003 | Lohn | 60/203.1 |
| 2003/0173464 A1* | 9/2003 | Herpay | 244/158 R |
| 2004/0245406 A1 | 12/2004 | Guiheen | 244/169 |
| 2010/0170997 A1* | 7/2010 | Smith | 244/172.3 |

FOREIGN PATENT DOCUMENTS

| | | | | |
|---|---|---|---|---|
| EP | 0903487 A2 | 3/1999 | | |
| WO | WO 2007/132460 A2 * | 11/2007 | | H04M 15/06 |

OTHER PUBLICATIONS

EESR for related European Patent App. No. 08878787.4 issued on Apr. 27, 2012.

* cited by examiner

*Primary Examiner* — Rob Swiatek
(74) *Attorney, Agent, or Firm* — Ladas & Parry, LLP

(57) ABSTRACT

A microsatellite comprising a propulsion module for moving and/or pointing the microsatellite and an imaging device (100) mounted to the propulsion module. Furthermore there is a fuel supply (210) located within the imaging device (100).

7 Claims, 20 Drawing Sheets

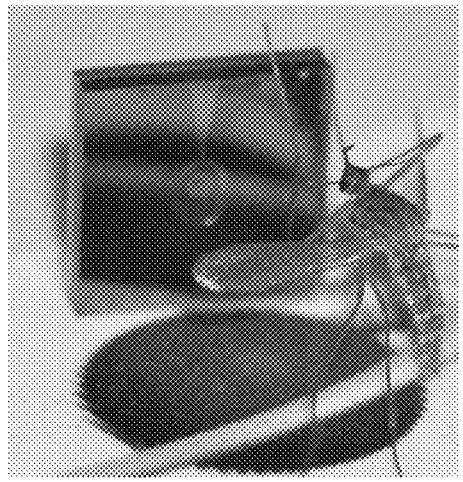
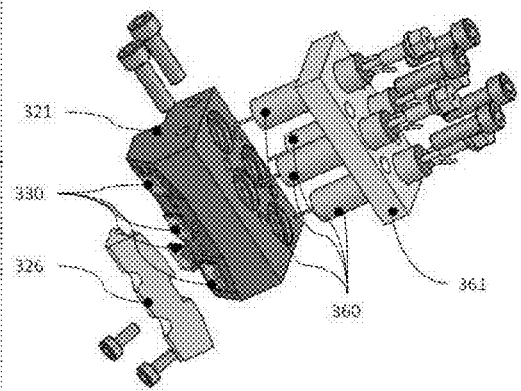
Figure 4A                    Figure 4B
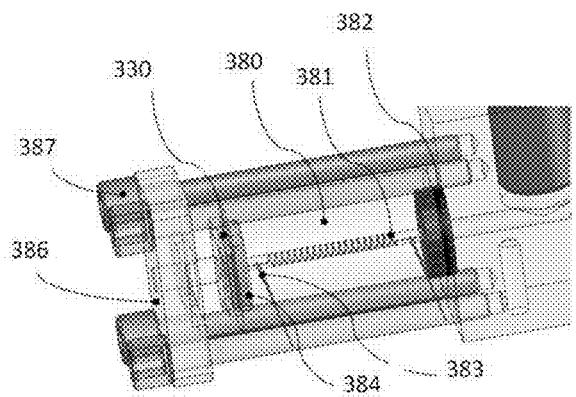
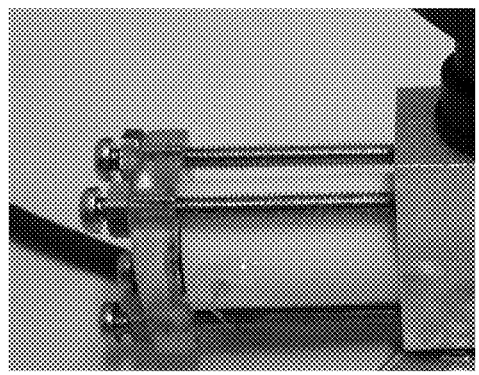
Figure 5A                    Figure 5B -- Prior Art --

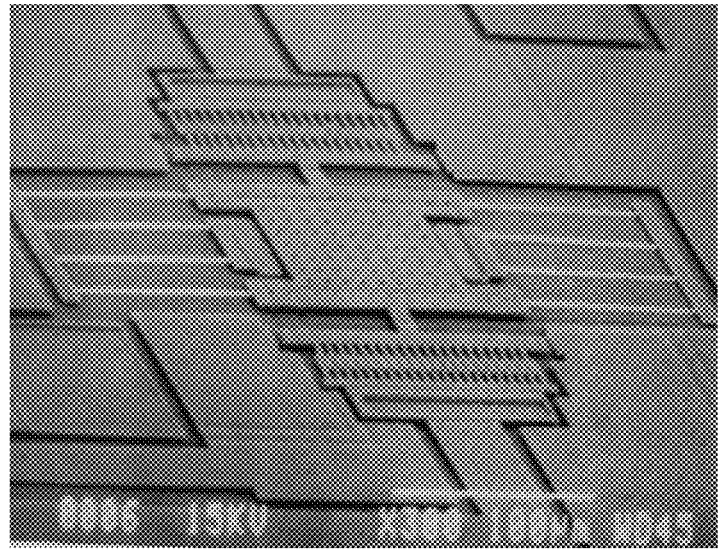
-- Prior Art --
Figure 8
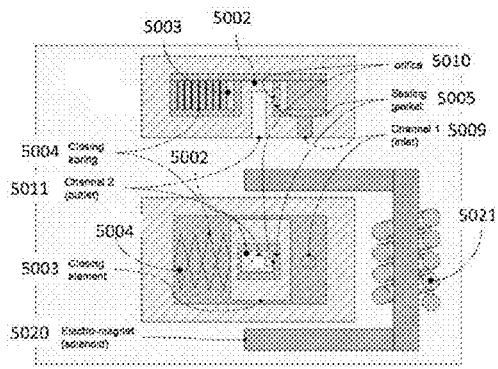
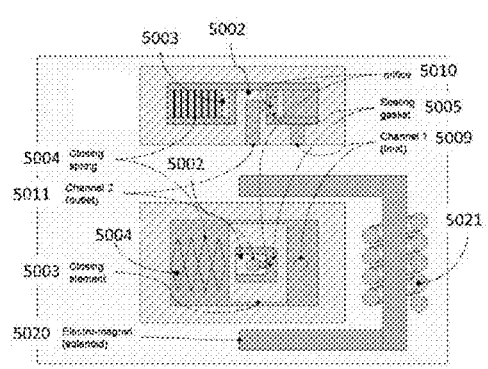
Figure 9A                    Figure 9B

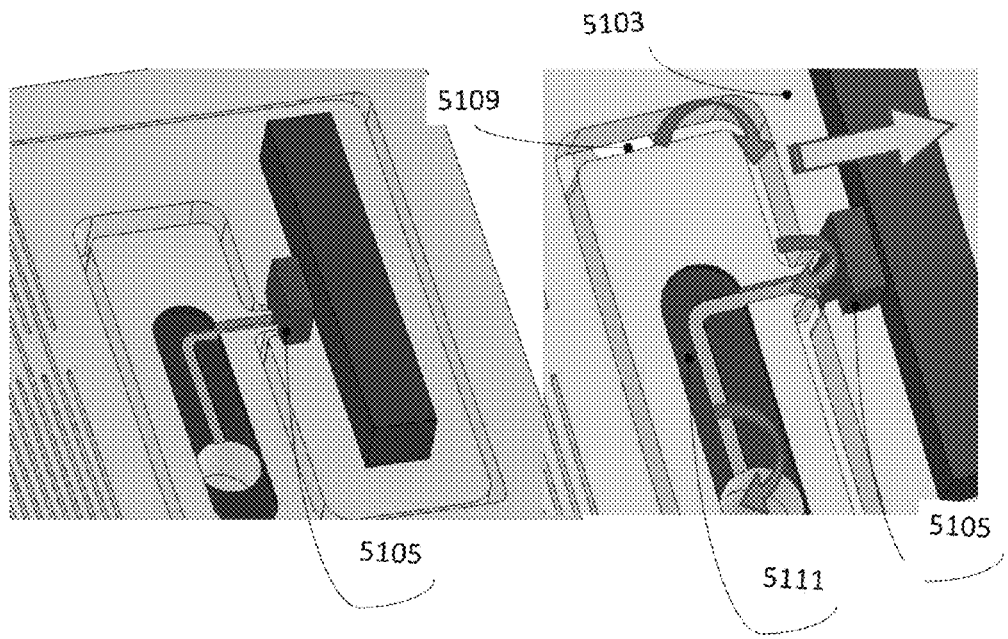
Figure 13A
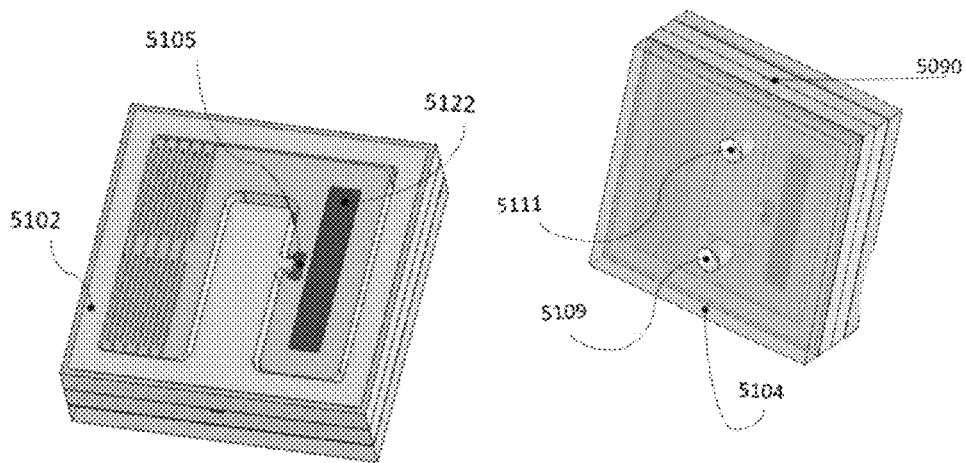
Figure 13B
Figure 13C

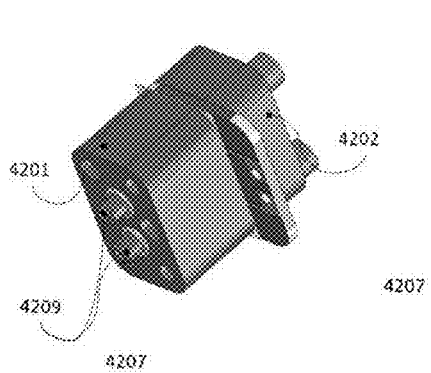
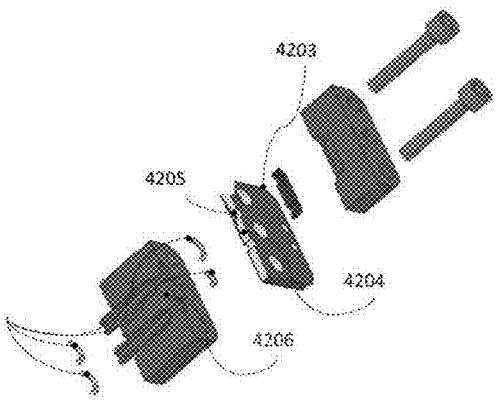
Figure 21A　　　　　　　Figure 21B
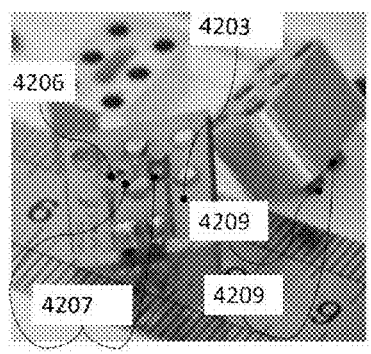
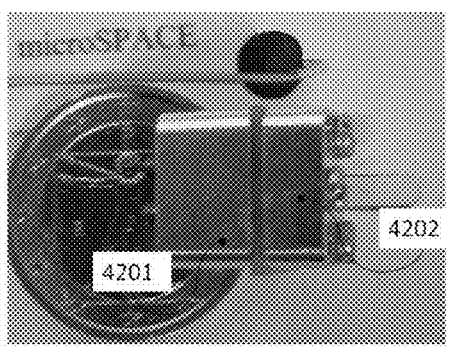
Figure 22A　　　　　　　Figure 22B
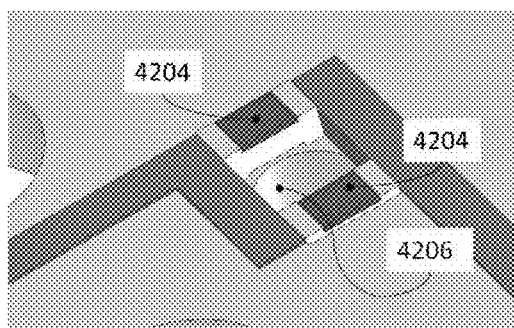
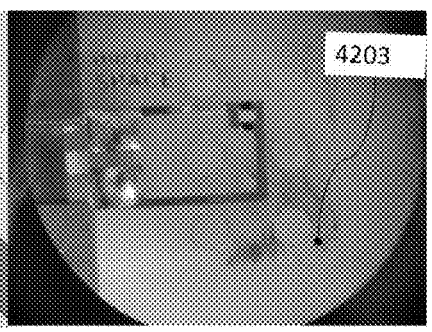
Figure 23A　　　　　　　Figure 23B

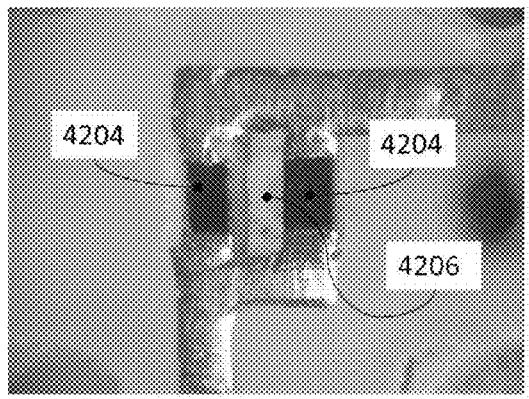 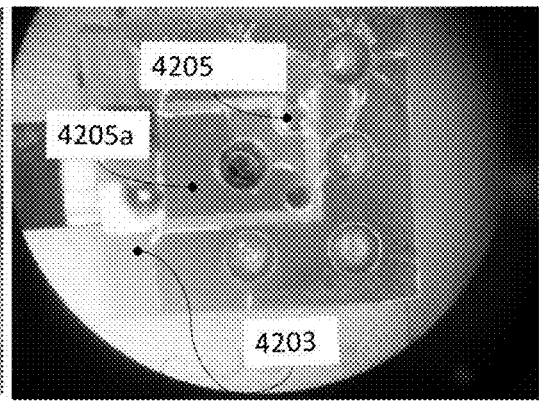
Figure 24A        Figure 24B
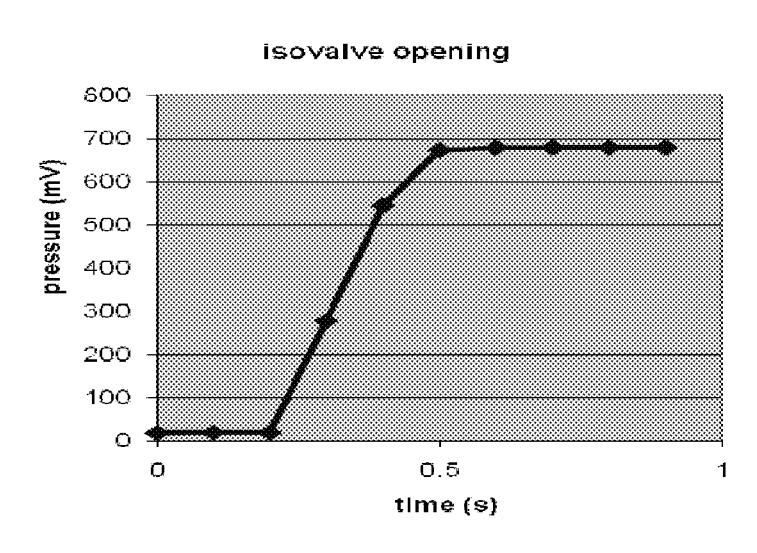
Figure 25

MICROSATELLITE COMPRISING A PROPULSION MODULE AND AN IMAGING DEVICE

CROSS-REFERENCE TO RELATED APPLICATIONS

This application is the U.S. National Stage of International Patent Application No. PCT/SG2008/000471 filed on Dec. 10, 2008 and which claims priority thereto, disclosures of which is hereby incorporated by reference in its entirety.

The invention relates to systems, modules and methods for the use of vehicles, such as those used for orbiting microsatellites, and the ancillary devices used therewith.

BACKGROUND OF THE INVENTION

Imaging from Space to Earth or other Space targets rely on the use of spacecraft equipped with cameras or telescopes using refractive or reflective lenses and sensor, detectors and attitude control devices such as thrusters, reaction wheels, gyroscopes to point such optical systems in the desired direction. Using more than one of such spacecrafts imaging the same target it may be possible to achieve a resolution higher than the one of each single optic. However, this requires precise knowledge and control of the relative position of the spacecraft.

Reaction wheels, gyroscopes and other "internal systems" are ineffective to control relative positions of spacecraft; the only useful systems are based on the action-reaction principle thereby requiring ejection of mass from the spacecraft to generate the needed thrust. Therefore all such thrusters require a container for the material to be expelled which is usually stored in a fluid form such as gas or liquid. Independently on the containment method and propulsion principle, the size of the container ultimately limits the maneuvering lifetime and therefore the usability of the imaging spacecrafts. A bigger container will allow for a longer lifetime for identical other parameters.

High resolution optics, in whichever part of electromagnetic spectrum, requires big focal lengths for high magnifications and large apertures to collect sufficient amount of radiation from the far away targets to impress the detection sensors.

For a given configuration and technology, a bigger optical system will allow for a higher quality image of better resolution.

It is therefore clear that propellant containers and optical systems are competing for volume available on the spacecraft when designing them for the best performances. Having such systems separately arranged on a spacecraft requires strong structures for both of them; in fact the propellant container has to withstand pressures and accelerations loads, while the optics needs high structural stiffness to guarantee precise positioning of the lenses. Such separate strong structures increase the total mass of the spacecraft and ultimately their manufacturing and launch costs.

SUMMARY OF INVENTION

In a first aspect the invention provides a microsatellite comprising a propulsion module for moving and/or pointing said micro satellite; an imaging device mounted to said propulsion module; a fuel supply; wherein said fuel supply is located within said imaging device.

In a second aspect the invention provides an electromagnetic valve comprising a substrate having an inlet port; a planar valve assembly said valve assembly comprising a valve frame and a selectively movable seat member co-planar with said static member; said planar valve assembly forming a layer on the valve frame; an electro magnetic coil having an axis perpendicular to a plane of said valve assembly; said electromagnetic coil being adjacent to said valve assembly; said seat member having a ferromagnetic material placed on a portion adjacent to said electromagnetic coil; wherein on energizing the electromagnetic coil the seat member is arranged to move within the plane of the valve frame towards said coil from a closed position sealing the inlet port to an open position opening the inlet port.

In a third aspect the invention provides an electromagnetic valve for selectively switching fluid communication between an inlet port and either a first and second outlet port the valve comprising a substrate having the inlet port; a planar valve assembly said valve assembly comprising a valve frame and a selectively movable seat member co-planar with said static member; said planar valve assembly forming a layer on the valve frame; an electro magnetic coil having an axis perpendicular to a plane of said valve assembly; said electromagnetic coil being adjacent to said valve assembly; said seat member having a ferromagnetic material placed on a portion adjacent to said electromagnetic coil; wherein on energizing the electromagnetic coil the seat member is arranged to move within the plane of the valve frame towards said coil from a first position opening the first outlet port and sealing the second outlet port to second position opening the second outlet port and sealing the first outlet port.

In a fourth aspect the invention provides an isolation valve for sealing a fluidic channel comprising a membrane located across the channel said member capable of withstanding pressure within said fluidic channel; a heating source congruent with said membrane; the heating source arranged to disrupt the membrane and so permit fluid flow across the membrane through the fluidic channel; wherein said heating source includes a resistor connected to a power supply said resistor having a heating surface congruent with said membrane.

In a fifth aspect the invention provides a multiple actuation valve comprising a block having an inlet and an outlet; a deformable membrane congruent with said inlet and outlet; a biasing member arranged to selectively bias the membrane into sealing contact with the inlet and outlet, wherein on removal of the bias applied by the biasing member, the deformable membrane is arranged to by deform to permit fluid communication between the inlet and outlet.

In a sixth aspect the invention provides a latch assembly comprising a housing; a socket within said housing, said socket and housing in rotational engagement about a central axis; a pin in sliding engagement with said housing from a retracted position to an extended position along said central axis; wherein in the retracted position, a first portion of the pin is shaped to prevent relative rotation of the housing and socket, and in the extended position a second portion is shaped to allow rotation of the housing and socket.

In a seventh aspect, the invention provides a support apparatus comprising a first and second magnet having axial magnetization and facing opposite polarity and positioned so as to generate a selectively adjustable repulsing force; the first magnet fixed to a bracket; the second magnet positioned above the first magnet in rotational engagement; wherein the second magnet is arranged to be mounted to a rotating device with the repulsive force adjusted to support the weight of the device and permit free rotation of said device through relative rotation of the first and second magnets.

In one embodiment, the present invention may combine optical and propellant containment systems in order to share efficiently volumes and structures. For this embodiment it is only required that the propellant material is sufficiently transparent to the electromagnetic waves that need to be collected by the detector sensor, the propellant material refraction properties are negligible or can be taken in to account in the design of the optical system and the structure can withstand the pressure of the propellant with negligible or controllable deformation.

In the following sections we will elaborate the general features of the invention with reference to a possible configuration while other configurations will be evident to the experts in the field by applying the general features of this invention.

BRIEF DESCRIPTION OF DRAWINGS

It will be convenient to further describe the present invention with respect to the accompanying drawings that illustrate possible arrangements of the invention. Other arrangements of the invention are possible, and consequently the particularity of the accompanying drawings is not to be understood as superseding the generality of the preceding description of the invention.

FIGS. 3F and 3G—A micropropulsion module according to two further embodiments of the present invention;

FIGS. 4A and 4B—A Micro nozzle and Micro thruster module according to a further embodiment of the present invention;

FIGS. 5A and 5B—A Heater and Vaporisation assembly according to a further embodiment of the present invention;

FIG. 8—An Interdigitated electrostatic actuator according to the prior art;

FIGS. 9A and 9B—A Microvalve according to one embodiment of the present invention;

FIGS. 13A-13C—The Microvalve according to FIG. 10;

FIGS. 21A and 21B—An Isolation Valve according to a further embodiment of the present invention;

FIGS. 22A and 22B—An Isolation Valve according to the embodiment of FIGS. 21A and 21B;

FIGS. 23A and 23B—The resistive heater according to the embodiment of FIGS. 21A and 21B;

FIGS. 24A and 24B—The resistive heater and isolation membrane for an Isolation Valve according to FIGS. 23A and 23B;

FIG. 25—A characteristic of downstream Pressure-v-Time for an Isolation Valve according to FIGS. 21A and 21B;

DETAILED DESCRIPTION

Figure 1A:
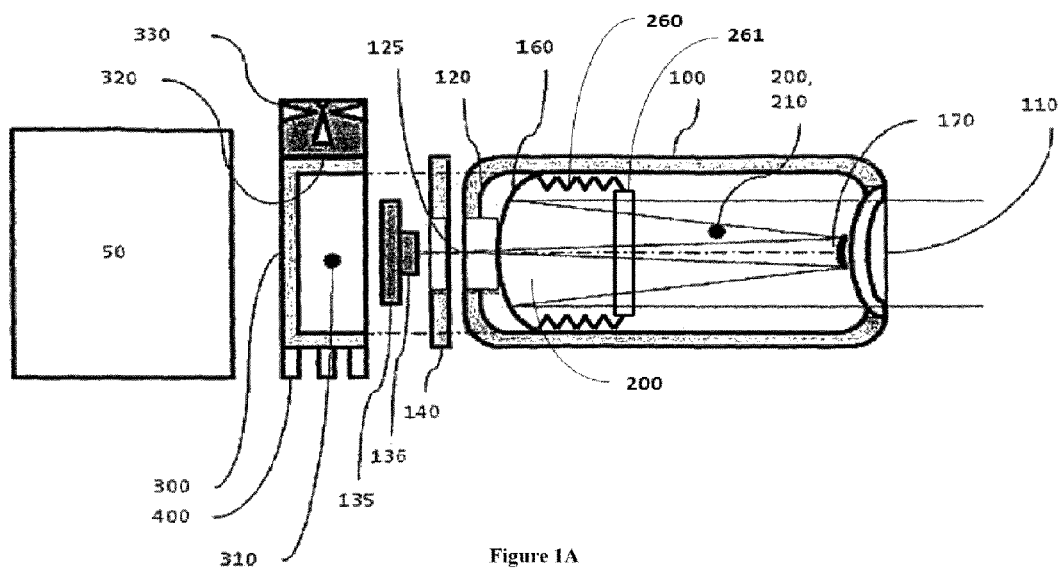
FIGS. 1A, 1B and 1C—A Microsatellite with a telescope mounted thereto according to one embodiment of the present invention.
Figure 1B:
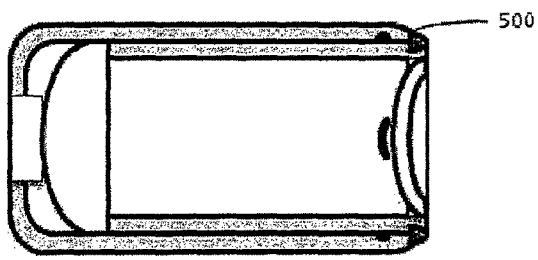
Figure 1C:
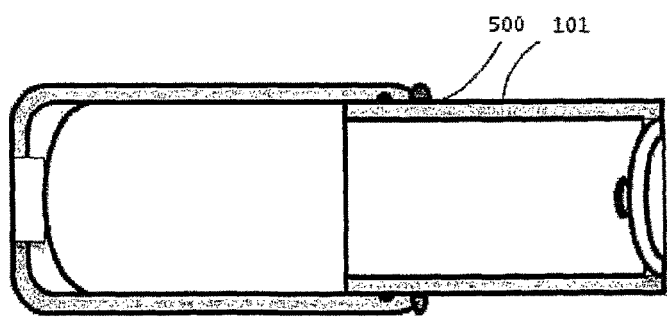

The invention involves a vehicle moving through space, such as a microsatellite traveling in an orbital path. The microsatellite according to the embodiment of FIGS. 1A to 1C and 2A to 2B includes an optical chamber, or tube 100 closed at one side by an optically transparent window 110 and at the other side by a flange 120 that allows for the placement of an optical detector 130 in correspondence with an opening 125. The window 110 can also be conveniently shaped as a lens to perform a focusing or correction function in combination with the other lenses or mirrors that combine the optical system. The window 110 has at least the function of closing the tube 100 also with the help of a gasket so that the optical tube 100 can contain a pressurized fluid 200 to be used as propellant. The opening 125 allows for an optical detector 130 such as a CCD or CMOS to receive the image projected by the optical system of lenses and mirrors on the focal plane. The sensor 130 can be before or behind a cover 140 that close hermetically the optical tube 100 also thanks to a gasket.

A set of focusing and correcting lenses or mirrors can be placed inside the tube by means of spacers in a way commonly used in telescope optics with the only care of allowing for pressure equalization holes among the various sub-chambers created between the lenses.

In this configuration the elements 100, 110, 120 and 150 define a closed volume, such as a fuel supply or more specifically a fuel chamber 210 that contains the propellant fluid/fuel 200 preferably in the form of pressurized gas, but also possibly as liquid.

If the sensor 130 is inside the volume/fuel chamber 210 then its electrical and electronic connection cables will pass through the containing walls by means of a dedicated feedthrough connector 220.

Figure 2A:
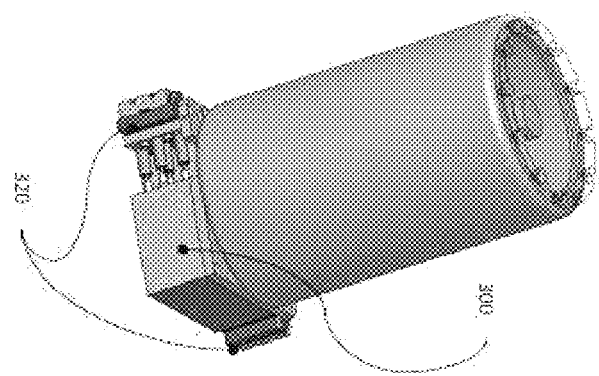
FIGS. 2A and 2B—A Microsatellite with a telescope mounted thereto according to a further embodiment of the present invention.
Figure 2B:
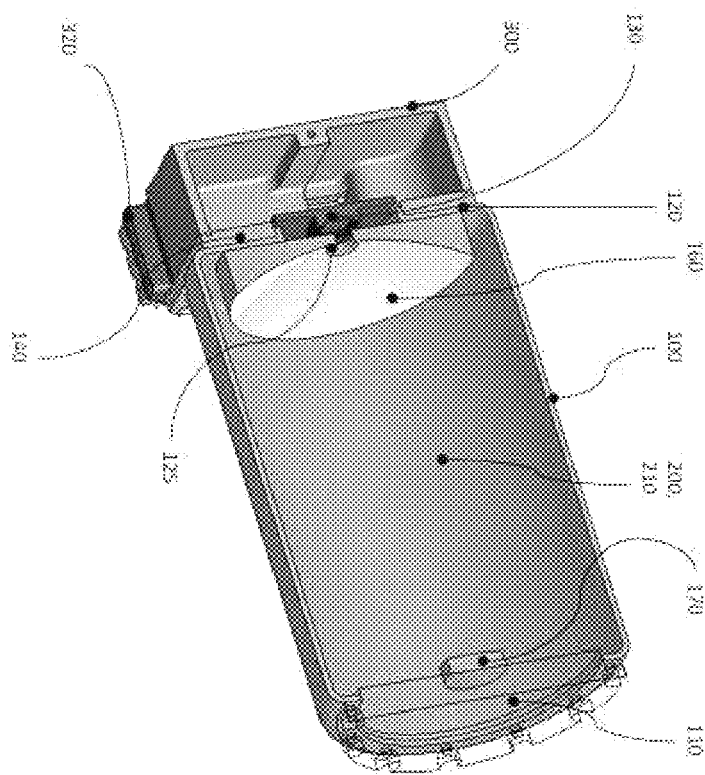

For the purpose of clear explanation, the FIGS. 2A and 2B represent an optical configuration known as Matsukov-Cassegrain which typically guarantees a very compact volume with a considerably long focal length. The light from the imaged target first passes through the window 110 which has also the function of correcting lens to reduce the typical aberration of such kind of reflective optic. Then the light rays pass in the optical tube through the stored propellant gas and are reflected by the main mirror 160 placed at the end of the tube 100 on the flange 120. After reflection they hit the secondary mirror 170 placed at the entrance of the tube 100 and are reflected back again until they reach the sensor 130 through the opening 125 in the main mirror and in the flange 120.

If the optics are attached to various points of the tube 100, care should be taken in the design to ensure negligible deformations of the tube under pressure so that the optical geometry is not disturbed. Alternatively the optics can be suspended to a structure internal to the tube and subjected to balanced pressures.

In case the variation of propellant refractive index due to changes in pressure and temperature need to be compensated, the optics can use deformable supporting structures (100, 101) composed by sealed chambers that deform in a shape canceling the optical effects on the fluid.

In case the propellant is stored in liquid form it is essential to avoid any liquid free surface or sloshing. This can be achieved by a bellow 260 inserted in the optical tube 100 and terminated by a flat transparent window 261 that contains the liquid 200 and contracts as it is used in order to keep it under pressure. The transparent window 261 will be part of a piston sliding inside the optical tube 100 and keeping pressurized the fluid by means of a spring or pressurized gas inserted in the chamber defined by the windows 261 and 110.

Although this invention is applicable to any size of space imaging spacecraft, it shows its best advantages in the smallest satellites such as the Cubesats which have a typical square cross section of 100 mm.times.100 mm and length between 100 mm and 300 mm. With reference to a Cubesat satellite, FIGS. 2A and 2B show the propulsion module 300 attached to the optical tube and propellant main container 100. In its configuration most efficient with respect of volume usage the propulsion module is also performing the function of secondary propellant container, whereby its internal volume 310 is connected to the optical tube volume/fuel chamber 210 through the window 125. For optimal use of space, the optical sensor 130 and its electronics 135 as well as other satellite electronics 136 can be contained inside the volume 310 where they are also very well protected from space radiations by the metallic walls constituting the module 300.

Placement for thruster modules 320 that control the attitude of a spacecraft is at the opposite corners of the spacecraft external envelope. It is also known that 2 couples of modules each with 4 nozzles 330 in cross and opposite configuration can control the attitude of the spacecraft on the 3 axes by subsequent rotations about two axis thanks to the torques achieved by firing opposite thrusters on opposite modules.

This invention allows the integration of such opposit-thruster modules 320 at opposite corners a & b of the propulsion module 300 without using any connecting pipe that is typically a risk of leakages and also of difficult assembly. The pipeless integration is obtained by screwing the thrust control valves 360 directly between the wall of the propulsion module and the thruster module. Since the valves 360 may still present a minimal leakage an isolation valve 400 is introduced to separate the actual gas volume 310 from the valve inlet volume 315. For easy assembly and replacement the isolation valve 400 is attached to one of the corners of the micropropulsion module 300 left available by the thruster modules. A drilled channel connects the inlet of the valve 400 to the volume 310, while another drilled channel 311 connects the outlet of the valve 400 to the plenum 315 drilled in the walls of the module 300 also connected to the thrust control valves 360. The transversal channel 312 necessary to connect the isolation valve 400 with the thruster module 320 *b* at the opposite corner is drilled in an internal rib of the module 300 that acts as structural stiffening element. Nearby the isolation valve is placed the gas filling check valve 362 and the pressure sensor 363 also connected to the volume 310 by means of drilled holes.

In order to allow the insertion of the sensor 130 and electronics 135 and 136 the micropropulsion module is shaped as a box with a lid attached by screws and sealed by a gasket. The lid can be joined or made integral with the flange 120.

The electronic cables pass through the module wall 300 by means of feed trough connectors 305.

For a higher amount of gas to be contained a pressure regulator 380 may be necessary to supply the various valves at lower pressure. The pressure regulator can be on the inlet of the isolation valve, at its outlet or between the main tank 100 and the secondary tank 300, especially if the electronics 135 and 136 do not tolerate high pressures.

In order to achieve optical lengths longer than the total volume allowed during the satellite launch, an extendible structure may bring the first group of lenses forward once the satellite is deployed and ready to operate. This structure can be made by 2 or more sliding rods activated by compression springs or other extension actuators and released and locked in place by pyrotechnic latches 500. Alternatively, the whole optical tube can be divided in cylindrical sliding sections 101 extending to the full length under the pressure of the propellant once the latches are released thereby reducing the pressure in the tank to produce less stress on joints and gaskets and less risk of leakages. Accordingly, this may act as stress relaxation on the structure to minimize or eliminate fatigue, creep or other detrimental time dependent effects.

The embodiment allows for the existence of a double hierarchy of chambers, the main chamber 210 containing the fuel and connected to the telescope volume, the second chamber connected to the thruster modules 320 by means of the thrust ports on the housing walls, the two chambers connected together by means of peripheral equipment (i.e. an isolation valve) that allows said connection only when thrust is required, otherwise isolating the main chamber from the second chamber to minimize or cancel the risk of leakages.

Figure 3A:
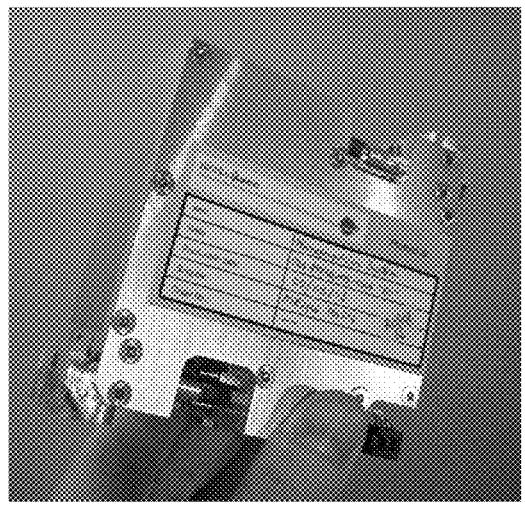
FIGS. 3A-3E—A Micropropulsion module according to a further embodiment of the present invention.
Figure 3B:
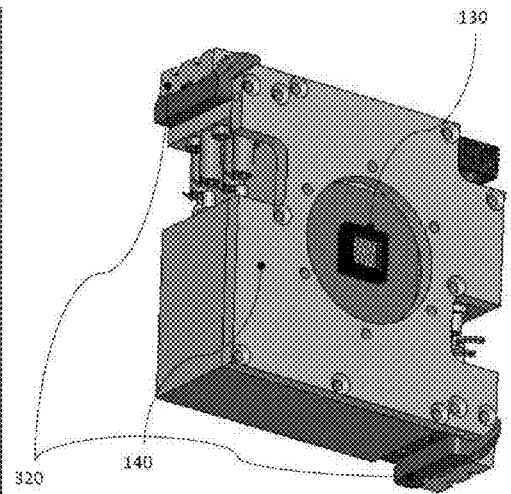
Figure 3C:
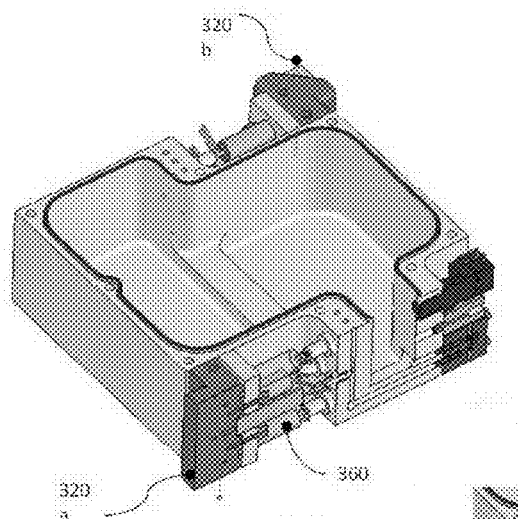
Figure 3D:
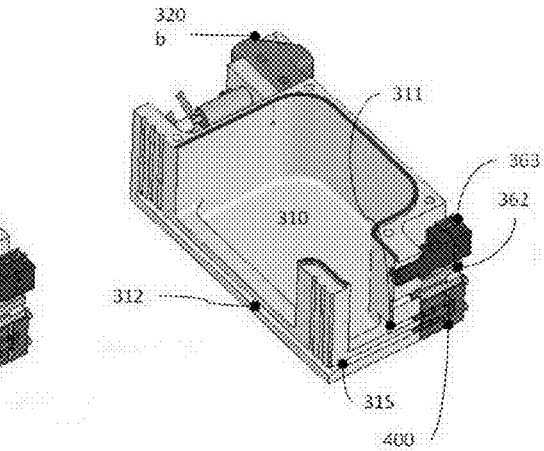
Figure 3E:
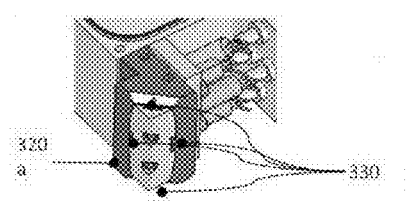
Figures 3F, 3G:
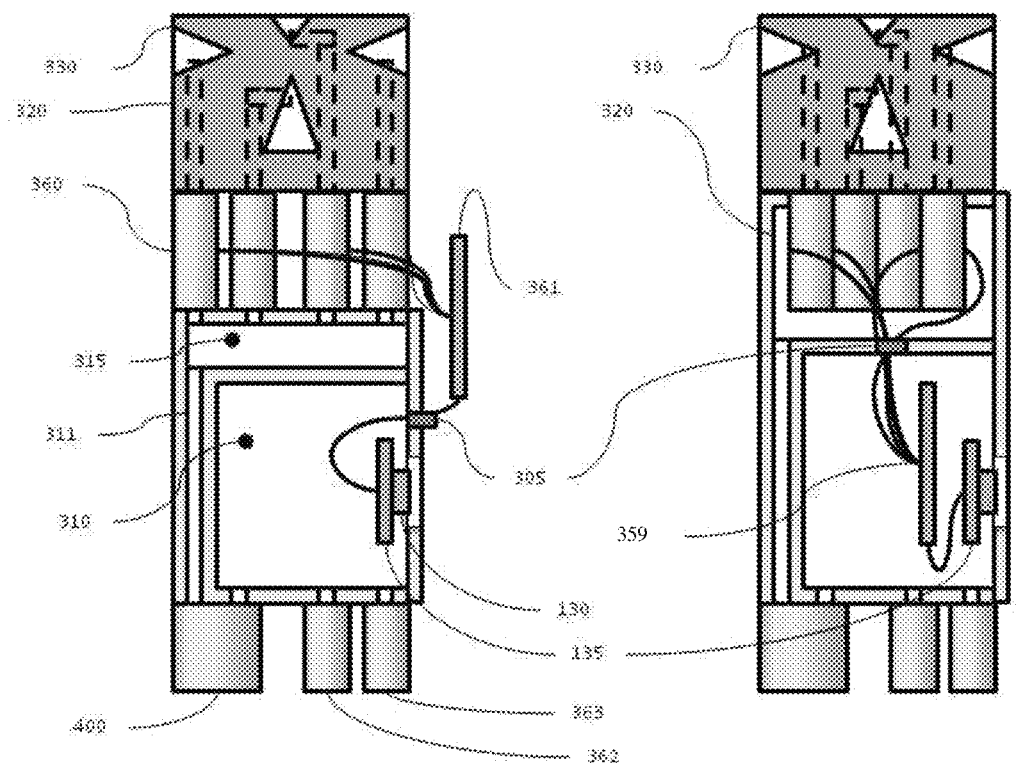

If the electronics 359 that control the valves 360 are placed inside the tank volume 320 to optimize the use of space, then the valves 360 can be conveniently placed inside the second chamber 315, as shown in FIG. 3F, thereby avoiding at least one fluidic joint and the related risk of leakages or reduced reliability.

For applications that do not require the use of optics integrated with the propellant containment, the lid can be simply flat and even soldered on the box if no electronic needs to be inserted.

The rest of spacecraft components 50, other payloads and even commercially available photographic cameras can be attached by means of adapters to the bottom of the box or to the flat lid.

Micro Thruster Module

As shown in FIGS. 4A and 4B the thruster module 320 are mainly composed by a body 321, a set of microvalves 360, a microvalve gasket retainer 361 that compresses the sealing gaskets 362, a set of micronozzles 330, a micronozzle retainer 326 that lock them against the body 321 and compresses the sealing gaskets 326, all assembled by screws.

Simplified versions may be made employing 3, 2 or even just one nozzle and valve.

Alternative embodiments include the use heating or vaporization of the propellant by introducing a resistor 381 in the duct 380 before the nozzle 330 as shown in FIGS. 5A and 5B. Nozzle and duct are sealed by gaskets 382 and 384, the resistor is connected to an external electric circuit by means of conducting wires 383 passing through the duct 380 which is made of high temperature insulating material such as machinable ceramic "Macor™". The wires 383 are sealed by means of glass frit or similar means. The whole group is kept assembled by the head 386 and screws 387.

Microvalve

Although commercially available microvalves are perfectly compatible with the described configuration, we present a novel microvalve which achieves size and mass reduction by possible full integration in the micronozzle without sacrifice simplicity of manufacturing and assembly.

Microvalves can be classified first in terms of manufacturing technology, which defines the general architecture, as MEMS or Precision Engineering microvalves.

MEMS microvalves, as any other MEMS device, are realized on a typical flat substrate (Wafer), which could be a combination of silicon, glass or plastic, in order to use photolithographic and etching batch processes. Precision engineering microvalves have a more three-dimensional structure enabled by individual machining, punching or molding of each component.

Figure 6A:
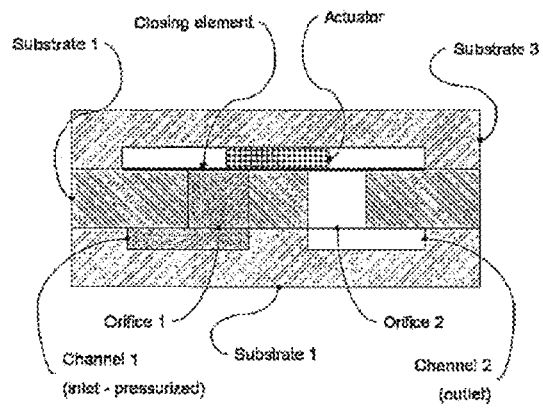
FIGS. 6A and 6B—A Microvalve according to the prior art.
Figure 6B:
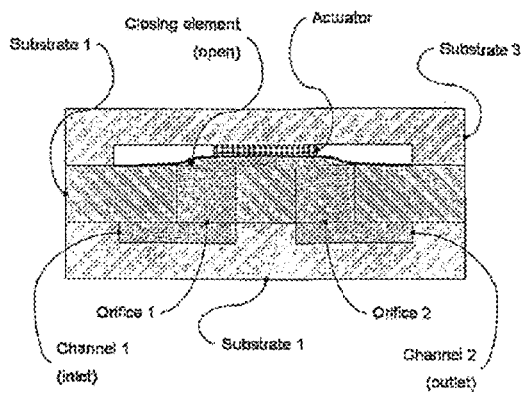
Figure 7A:
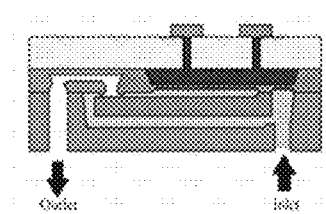
FIGS. 7A-7D—Further Microvalves according to the prior art.
Figure 7B:
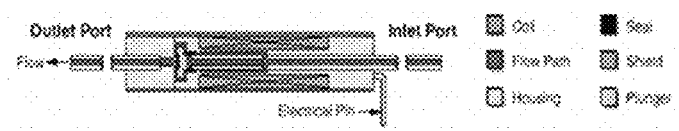
Figure 7C:
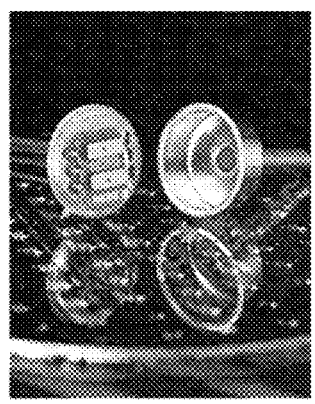
Figure 7D:
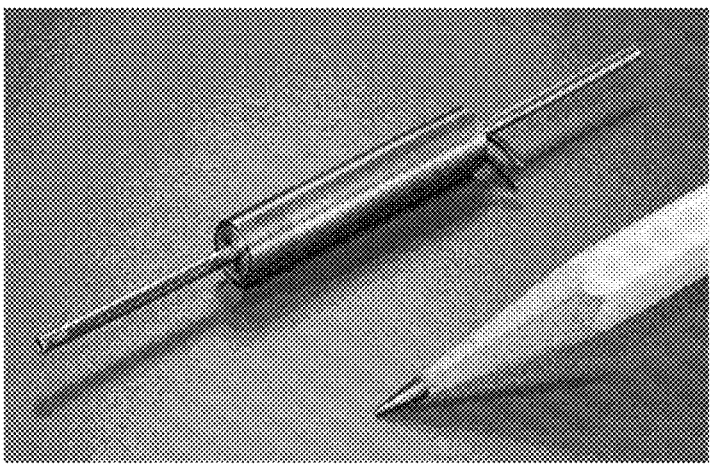

When aiming for high miniaturization, low price, high volume and high integration with other electronic devices, the MEMS approach is generally followed and is followed by the invention described here. As shown in FIGS. 6A and 6B, typical MEMS microvalves are composed by a cavity realized in one of the substrates and closed by the other substrate which presents one hole that is the valve orifice.

Such valve orifice is then closed or opened by an actuator, often realized in the form of a membrane, moving perpendicularly to the flat substrates and actuated in different ways, typically by means of
- deformation of piezoelectric crystals subjected to high voltage
- deformation of thermally actuated elements heated up by current flowing in to them using principles such as:
  - thermal volume expansion of solid structure, fluid phase change or expansion;
  - shape memory alloy effect;

Examples of commercially available microvalves are shown in FIGS. 7A to 7D, which represent a thermally actuated MEMS microvalve from the company Redwood Microsystems and an electromagnetically actuated precision engineering microvalve from the company Lee.

On the other hand, the performances obtainable with the use of electromagnetic effect are higher for the same actuator volume and energy used in terms of resulting speed and force on the actuator. This is due to the intrinsically higher energy density achievable with a well designed electromagnetic actuator. Another reason that normally discourages MEMS system to use the electromagnetic actuation is the complication in the realization of necessary coils and magnetic circuits due to material incompatibility, difficulty to be arranged in the typical flat architecture of MEMS and difficulty to realize the three-dimensional winding of the coil.

For these reasons, typical MEMS actuators use the effects mentioned above with the result of several drawbacks:
- weak actuation forces
- need of high actuation power or voltage.
- thermally actuated MEMS microvalves needs long time for the actuation due to the thermal inertia of the actuator in reaching the required opening temperature.
- the temperature needs to be maintained during the whole actuation constantly providing the electrical energy to compensate the thermal losses through the actuator material. This results in a high electrical consumption of the microvalve.

At this point it must be reminded that the primary functions of a microvalve are:
- when closed: to provide a safe closing of a fluidic orifice without allowing any leakage
- when open: to allow a good opening of the same orifice with minimum pressure drop in the flow of the fluid For the first function it is necessary to guarantee a high closing force by means of springs or by means of the high pressure in fluid in the inlet channel; this force must be overcome by the actuator during the opening to perform the second fundamental function of the microvalve.

Therefore, the capability to obtain high actuation forces is fundamental for a good valve.

Additionally, the opening speed is very important to perform precise control of the amount of fluid allowed to flow. This can be achieved if the actuation force is high and it can be applied instantaneously.

As it will be explained in the following section, the invention described here makes full use of the electromagnetic actuation and its advantages in a MEMS microvalve specially conceived without facing the typical problems of electromagnetic actuation described before.

Differently from microvalves, in the micro positioning application the function of the moving part does not relate to any fluidic channel or orifice, therefore the movement can be directed along the flat surface of the MEMS substrates and the electrostatic principle of actuation has been generally used; typical structures in this case are commonly called "interdigitated" due to the fingerlike shape as clearly shown in FIG. 8.

By means of such principle, only very small forces may be generated, but they are generally sufficient for the actuation of microscopic parts internal to the devices, while such electrostatic forces are typically not enough to actuate a valve The valve actuator is a miniaturized electromagnetic coil which axis is placed perpendicular to the substrate in which the microvalve mechanism is realized. This solution, not yet applied by any MEMS valve allows using relatively big magnetic circuit to actuate the microvalve mechanism. The moving part of the valve contains a little element of ferromagnetic material which interacts with the electromagnetic coil for the actuation. The axis of the electromagnetic coil is mounted out of the center of the ferromagnetic element at its resting position when the valve is closed. The actuation is achieved when the coil is energized and the magnetic field pulls the ferromagnetic element towards the centre of the coil to minimize the energy of the electromagnetic field.

The return and keeping in the closed position is realized by a spring embedded in the structure of the valve. The spring is preloaded during assembling of the valve by the insertion of the sealing element which is slightly thicker than the room provided for it at zero loading of the spring. Such preload guarantees the compression of the sealing element and therefore the absence of fluid leakages through the valve.

The extension of the actuator to the open position of the valve is limited by a stopper realized in the geometry of the actuator moving part; such limit guarantees that the stresses in the spring element are kept under the levels compatible with the elastic behavior of the material and well below the yield margin of the material.

The fluidic valve is mainly composed of the same basic elements as any other valve such as described earlier, which are here arranged in a planar fashion along the substrate material in a particular embodiment: inlet channel 5009, orifice 5010, sealing gasket 5005, gasket seat 5003 outlet channel 5011, closing element 5003, spring 5004 and actuator 5020. The electromagnetic actuating solenoid 5020 with its coil 5021 can be arranged independently from the substrates in any position suitable for the magnetic field to interact with the moving element. A possible configuration is shown in FIGS. 9A and 9B.

Figure 10:
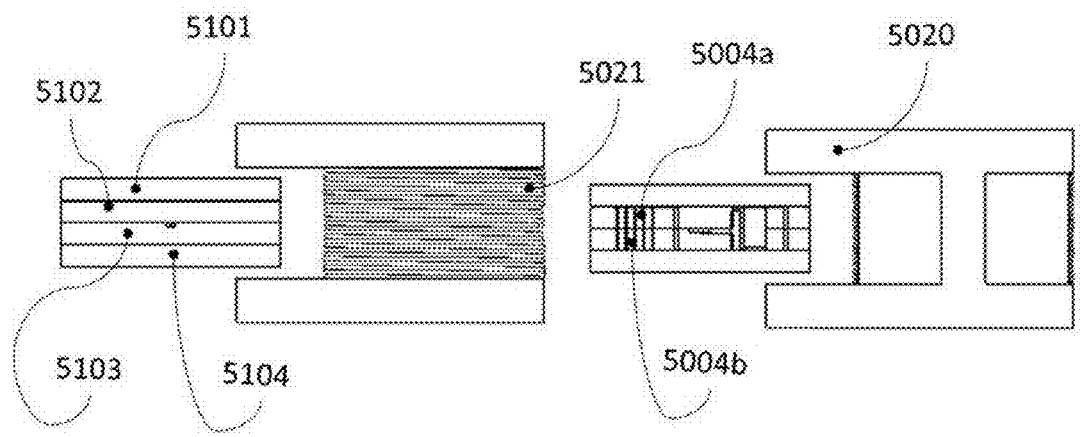
FIG. 10—A Microvalve according to a further embodiment of the present invention.
Figures 11A, 11B:
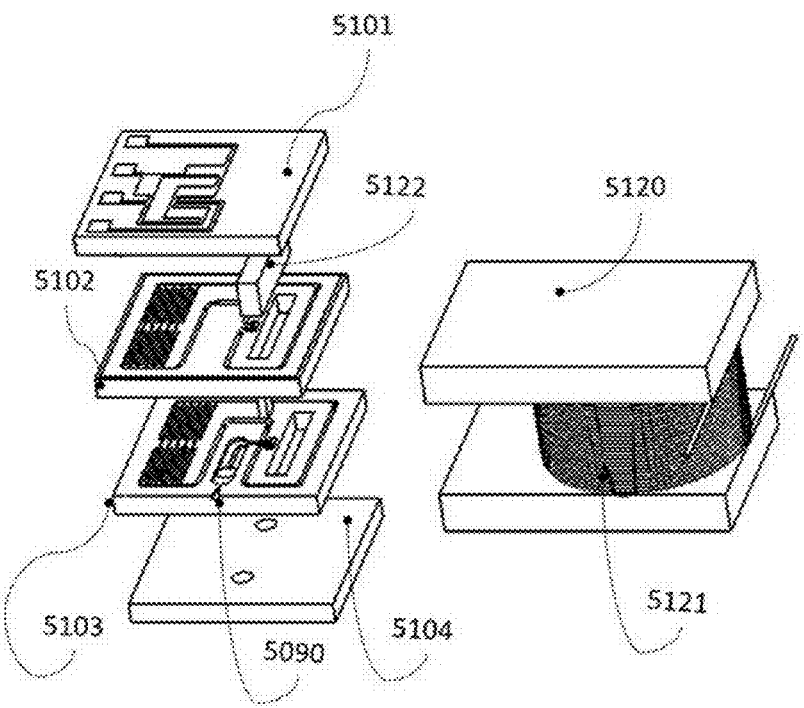
FIGS. 11A and 11B—The Microvalve according to FIG. 10.
Figure 12:
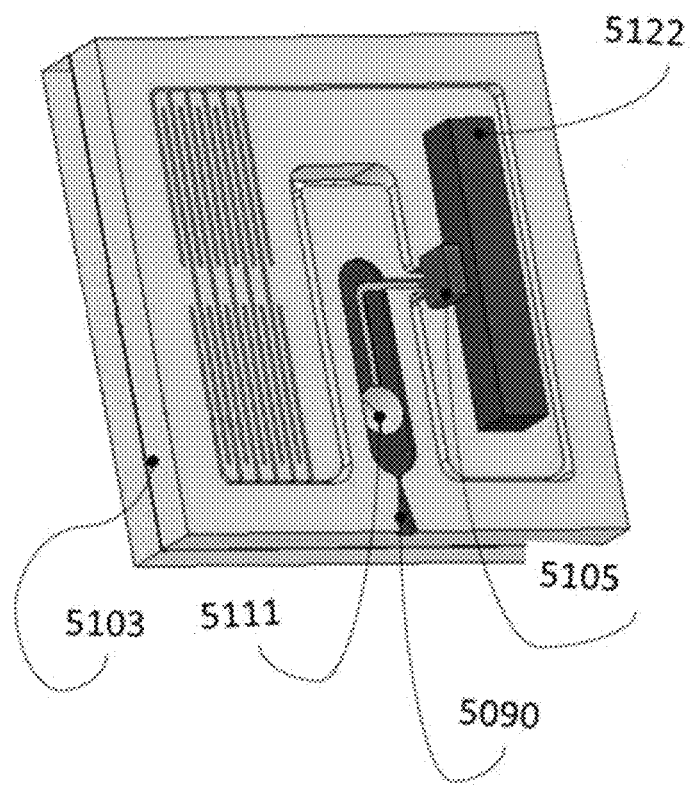
FIG. 12—The Microvalve according to FIG. 10.
Figures 14A, 14B:
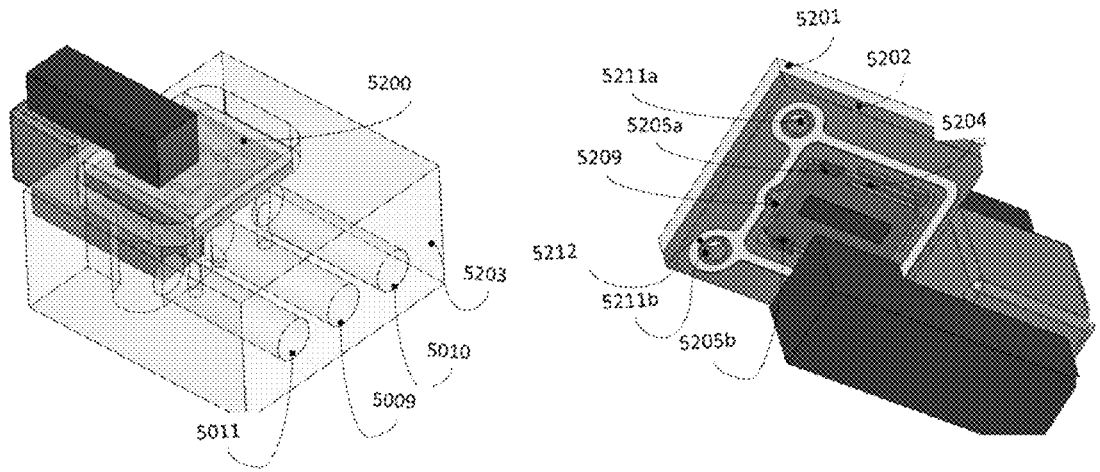
FIGS. 14A-14C—A Microvalve according to a further embodiment of the present invention.
Figure 14C:
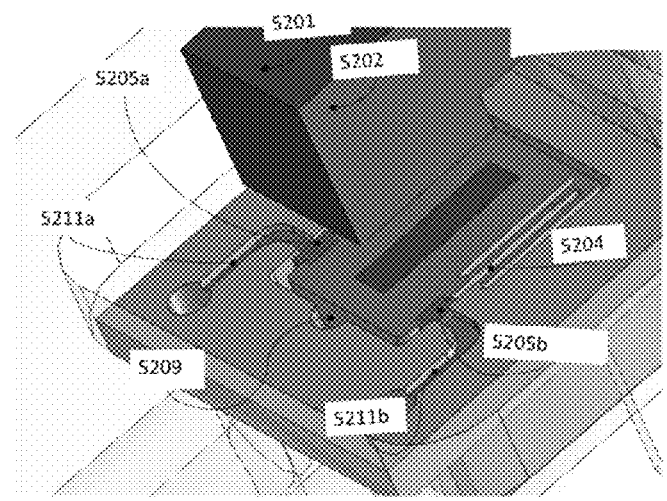

The microfluidic planar part of such configuration can be realized by means of Etching technology on silicon and it requires 2 internal silicon layers 5102, 5103 and 2 external glass layers 5101, 5104 in its most efficient embodiment as shown in FIG. 10—4 layers valve construction: a) view; b) cut view FIG. 10, FIGS. 11A and 11B and FIGS. 13A to 13C.

The four layers construction 5100*a-d* has the spring 5004 and moving body 5002 split in two symmetric parts (i.e. 5004*a* and 5004*b*) with the orifice 5010 realized in between them. This symmetry is necessary to allow a perfectly symmetrically aligned loading of the spring 5004 pressing the gasket 5005 on its seat 5002.

As shown in FIGS. 13A to 13C, the opening of the valve is achieved with the translation of the moving body 5103 by the action of the electromagnetic field provided by the electromagnet 5120 when its coil 5121 is energized and attracts the anchor 5122. In this situation the moving body 5103 releases its pressure on the seal 5105 and the fluid is allowed to flow from the inlet channel 5109 through the opened orifice in the outlet channel 5111 that can be made exiting perpendicularly to the substrates or parallel to them in a micronozzle 5090.

It must be noted that the sealing 5105 is inserted in a slot between the moving body and the orifice seat. Such slot is realized by manufacturing at a slightly smaller size than that of the gasket in order to compress the inserted gasket by means of the extension required to the spring 45004 when the gasket is in place. This special feature may allow the complete valve body, spring, moving body, orifice and gasket seat to be formed as only one monolithic part.

A simplest embodiment 5200 is possible using only two wafers (named "2 L" microvalve) for fabrication in facilities with less experience. In this case, only half of the sandwich will be realized using only one silicon wafer 5201 and one glass wafer 5202 and the structure will not be symmetric about its mid plane and it will be completed by inserted the chip in a packaging 5203 providing the bottom of the inlet 5209 and outlet fluidic connections. This simplifies the alignment requirements during the bonding and double side etching, but introduces a small asymmetric behavior in the extension of the spring 5204 and in the compression of the sealing element.

The fluidic passages are then completed by pressing the two-wafer sandwich chip in a packaging with a profiled seal 5212. Such package can be made in any material provided it is diamagnetic and it allows to keep the magnetic circuit with minimum gaps.

As shown in the FIGS. 13A to 13C and FIGS. 14A to 14C this embodiment has been configured to have one inlet 5209 and two outlet channels 5211*a* and 5211*b* as well as two gaskets 5205*a* and 5205*b* so that the valve can have one channel open for return of fluid at any time while the other is closed.

Figure 15A:
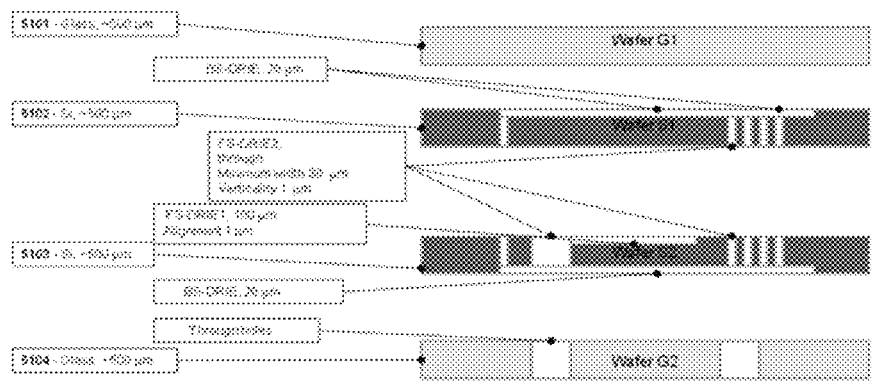
FIGS. 15A and 15B—A method of constructing a Microvalve according to one embodiment of the present invention.
Figure 15B:
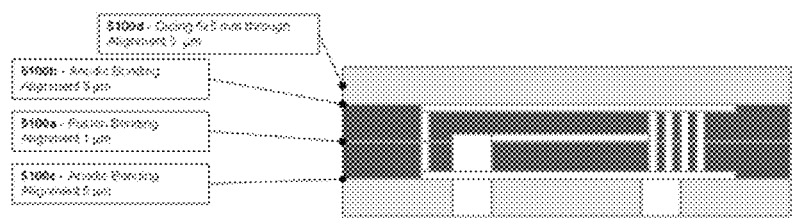

The process for the realization of the 4 L microvalve requires a combination of Deep-Reactive Ion Etchings, fusion and anodic bonding and dicing as depicted in FIGS. 15A and 15B. The two silicon wafers 5102 and 5103 are lithographed and etched on both faces to create the channels, and to create the gap that will allow the moving part to translate and they are etched through to create the elastic spring and allow the movement of the moving part.

The four layers construction 5100 has the spring 5004 and moving body 5002 split in two symmetric parts (i.e. 5004*a* and 5004*b*) with the orifice 5010 realized in between them. This symmetry is necessary to allow a perfectly symmetrically aligned loading of the spring 5004 pressing the gasket 5005 on its seat 5002.

As shown in FIG. 13, the opening of the valve is achieved with the translation of the moving body 5103 by the action of the electromagnetic field provided by the electromagnet 5120 when its coil 5121 is energized and attracts the anchor 5122. In this situation the moving body 5103 releases its pressure on the seal 5105 and the fluid is allowed to flow from the inlet channel 5109 through the opened orifice in the outlet channel 5111 that can be made exiting perpendicularly to the substrates or parallel to them in a micronozzle 5090.

It must be noted that the sealing 5105 is inserted in a slot between the moving body and the orifice seat. Such slot is realized by manufacturing at a slightly smaller size than that of the gasket in order to compress the inserted gasket by means of the extension required to the spring 5104 when the gasket is in place. This special feature may allow the complete valve body, spring, moving body, orifice and gasket seat to be formed as only one monolithic part.

A simplest embodiment 5200 is possible using only two wafers (named "2 L" microvalve) for fabrication in facilities with less experience. In this case, only half of the sandwich will be realized using only one silicon wafer 5201 and one glass wafer 5202 and the structure will not be symmetric about its mid plane and it will be completed by inserted the chip in a packaging 5203 providing the bottom of the inlet 5209 and outlet 5210, 5211 fluidic connections. This simplifies the alignment requirements during the bonding and double side etching, but introduces a small asymmetric behavior in the extension of the spring 5204 and in the compression of the sealing element 5205.

The fluidic passages are then completed by pressing the two-wafer sandwich chip in a packaging with a profiled seal 5212. Such package can be made in any material provided it is diamagnetic and it allows to keep the magnetic circuit with minimum gaps.

As shown in the FIG. 13 and FIG. 14 this embodiment has been configured to have one inlet 5209 and two outlet channels 5211*a* and 5211*b* as well as two gaskets 5205*a* and 5205*b* so that the valve can have one channel open for return of fluid at any time while the other is closed.

The process for the realization of the 4 L microvalve requires a combination of Deep-Reactive Ion Etchings, fusion and anodic bonding and dicing as depicted in FIG. 15.

The two silicon wafers 5102 and 5103 are lithographed and etched on both faces to create the channels, and to create the gap that will allow the moving part to translate and they are etched through to create the elastic spring and allow the movement of the moving part.

Before proceeding with the fusion bonding of the two silicon wafer the gasket, realized in a soft metal able to withstand the bonding temperature must be inserted in place.

Before proceeding with the anodic bonding of the bottom layer of glass, the anchor made of ferromagnetic material is put in place.

After the 3 bonding steps are completed the chips are diced from the wafer.

Figure 16A:
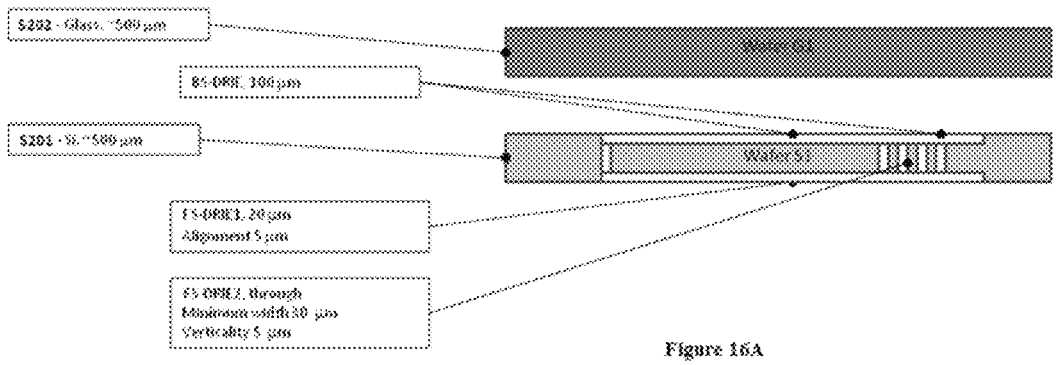
FIGS. 16A and 16B—A method of constructing a Microvalve according to a further embodiment of the present invention.
Figure 16B:
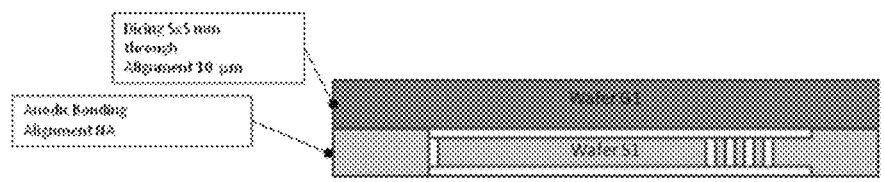

As shown in the FIGS. 16A and 16B the process for the realization of the 2 L microvalve require a similar set of steps, but simplified due to the absence of difficult bonding alignment requirements and due to the accessibility of seat and anchor cavity after bonding and dicing, so that low temperature materials can be used for the seal (i.e. rubber) and for the anchor (i.e. magnetized alloys)

Figure 17:
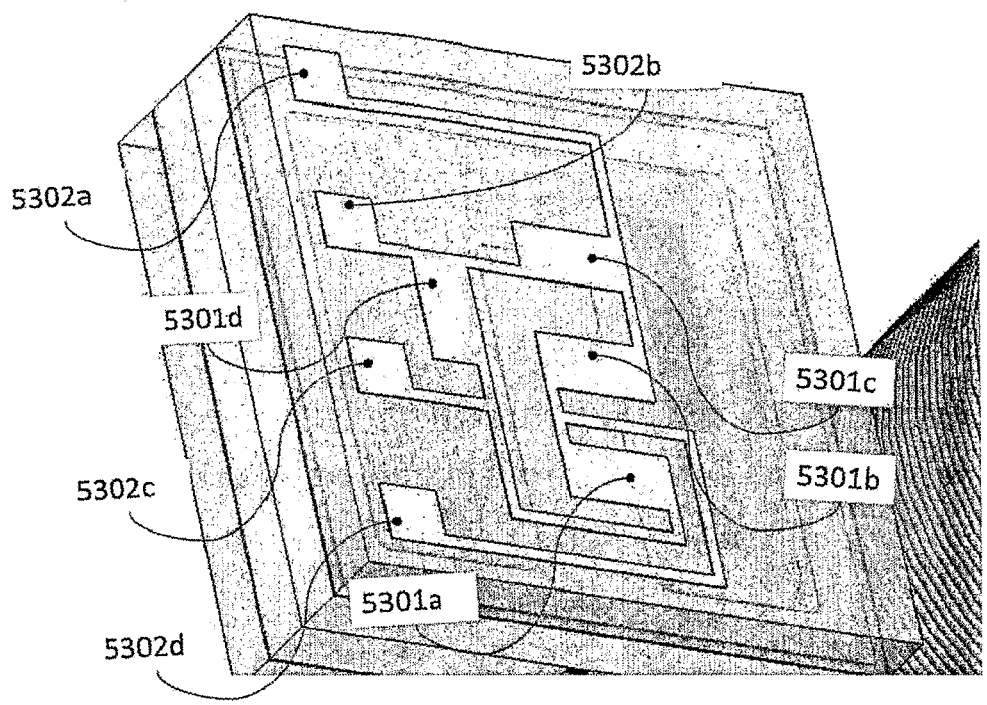
FIG. 17—A Microvalve showing an integrated pressure sensor according to a further embodiment of the present invention.

A pressure sensor can be easily integrated in the system by taking advantage of the deformation of the chamber of the valve under pressure. As shown in FIG. 17, an electrodeposited and lithography patterned layer of resistors 5301a to 5301d and conductors will realize a Wheatstone bridge which electric unbalance produced by the chamber deformation can be detected by an external circuit and correlated to the internal pressure. The electrical connection will be realized by probes or wire bonding or by soldering to the electrode pads 5302a to 5302d.

Figure 18:
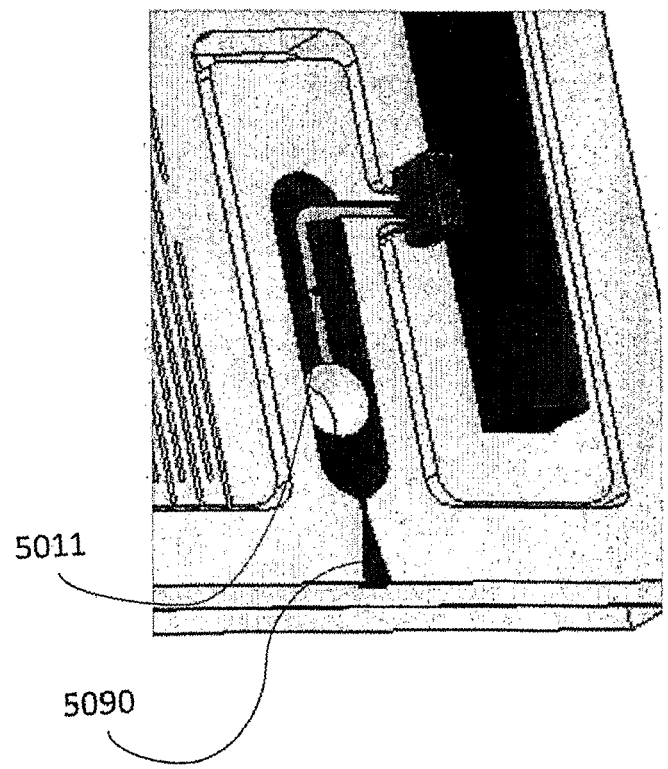
FIG. 18—A Microvalve showing an integrated micronozzle according 5 to a further embodiment of the present invention.

The outlet of the valve can be connected on the hole realized on the bottom 5111 or on the side of the chip 5090 through a convergent divergent micronozzle, thereby realizing a fully integrated MEMS controllable microthruster or micro-mass flow controller as shown in FIG. 18.

Characteristics of the electromagnetic valve according to various embodiments of the present invention include:

i. its movement parallel to the substrates, while all the actuators developed for similar functions are moving perpendicular to the substrates
  ii. the actuation by means of energy provided by an external electromagnetic field created by a solenoid completely decoupled by the actuator itself, while all the other similar actuators are working on thermal-expansion or electrostatic or piezoelectric system requiring a much intimate contact of the energy providing element with lower energy densities, higher complication and cost.
  iii. The design based on only 1 simple and reliable micromachining process, namely Reactive Ion Etching (RIE) and two simple and reliable packaging processes, namely Anodic Bonding and Silicon Fusion Bonding.
  iv. The opening of the microvalve seat in the direction parallel to the substrates
  v. The closing force and preload of the microvalve produced by means of springs realized in the bulk of the substrates
  vi. The realization of valve body, moving element, elastic element, orifice, gasket seat in one monolithic part
  vii. The integration of a separate sealing element that can be inserted in the assembly allowing for the choice of virtually any material depending on the final destination of use (i.e. aggressive fluids)
  viii. The absence of contact of the circulating fluid with any electrical part of the system
  ix. The use of the microvalve as MEMS integrated microdruster
  x. The use of the microvalve as MEMS integrated micro flow controller Isolation Valve The isolation valve 400 is made in two different configurations: single actuation and multiple actuation.

The single actuation valve is based on a membrane melted by a small resistor reaching high temperature by Joule effect.

Figure 19:
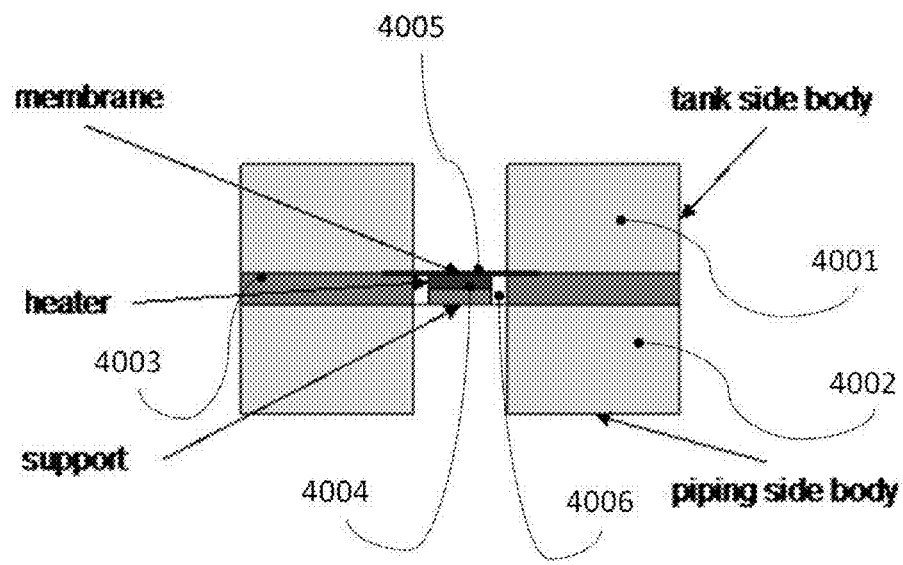
FIG. 19—An Isolation Valve according to one embodiment of the present invention.
Figures 20A, 20B:
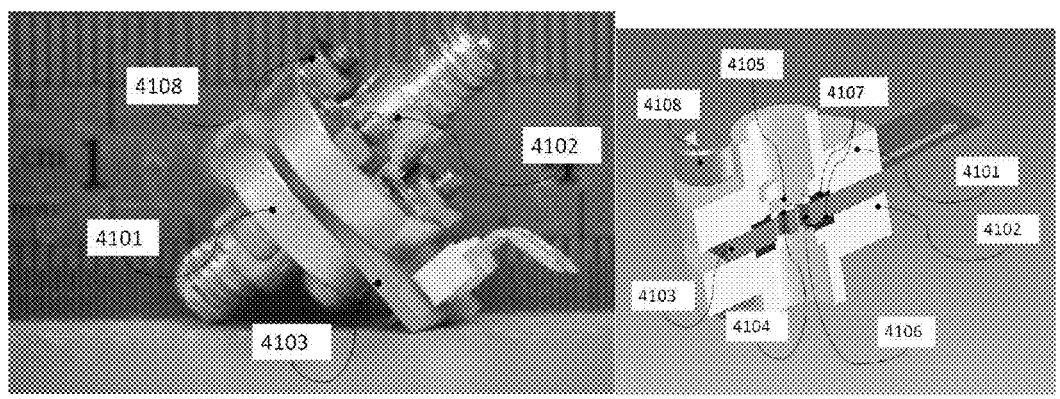
FIGS. 20A and 20B—An Isolation Valve according to a further embodiment of the present invention.

As shown in FIG. 19, the thermally actuated isolation valve is composed by a thin membrane 4005 supported on a robust diaphragm 4003 with holes 4006 which separate the tank volume from the piping connection. The membrane is weakened and eventually locally melted by a heater 4004 in order to allow the pressure of the gas in the tank to brake the membrane and open the valve. The supporting diaphragm is placed between the tank body 4001 and the piping collector body 4002.

The heater 4004 is a commercial Surface Mounted Device resistor of 50 Ohm or two or more of them placed on the sides around the hole 4006 for a total resistance of 100 Ohm in a combination of parallel and series (two resistors of 100 Ohm in parallel or two parallel couples of 25 Ohm resistors in series). A voltage of 12V is applied to the resistors 4004.

There are two basic configurations, one in which the fluid passes through the valve in one direction (named "T"), suitable to be mounted between threaded pipes or between a tank and a threaded pipe and a second one in which the fluid passes through the valve and returns on the same side where it entered after the opening of the valve, (named "R").

As shown in FIGS. 20 to 24, the membrane 4105 is supported by a printed circuit board, "PCB" 4103 also supporting one or more resistors 4104 to which it provides electrical connections. The membrane 4105 and the PCB 4103 are sandwiched between the body 4101 connected to the pressurized tank and the body 4102 connected to the downstream piping. The resistors 4104 are placed besides one or more holes 4106. The complete sandwich is leak free thanks to two gaskets 4107 and packed by means of screws 4108.

The basic embodiment of the valve "R" is made by a main body 4201 and a closing head 4202 sandwiching the membrane 4205 and its support 4203 carrying the resistors 4204 and presenting holes 4206 for the passage of the gas through the valve.

The difference with the valve "T" is evident by observing the function of the head 4201 to redirecting the flow to the main body 4201 through a second hole in the membrane support 4203. In this way, provided the tank mantel or case contains also the downstream channel, the isolation valve "R" is of easier replacement operating only from one side of the tank and not between tank and piping as in the case of the valve "T".

There are two variations in the embodiments for the isolation valve "R", one in which the body of the valve is made by two bulky bodies 4201 and 4202, named "RB", and one in which the valve is a sandwich of thin substrates (named "RS"). The main difference consists in the sealing used between the membrane and the downstream body. Such body is in contact with the backside of the PCB supporting the sealing membrane.

In the case of the bulky bodies, as shown in FIGS. 21A and 21B, the sealing is achieved by means of micro O-Rings 4207 compressed between the bodies and micropipes 4209 that runs between the bodies thereby creating alignment to the tank and solidity of the system.

In the case of the sandwich "RS" the sealing is obtained, on one side in the same way as the bulky bodies, while on the other side by means of soldering of pre-tinned surfaces on the substrates.

In any case the membrane is glued on the heater substrate by means of an additional sticky tape layer 405a or being itself realized by punching from a sticky tape.

The choice of the membrane material must be such as to be able to withstand normal high temperature up to 150 C and low temperature down to −50 C, and at the same time it must be able to reach melting point at around 250 C before the heat produced by the heater reaches other vital elements such as the O-Rings 4207 or more peripheral areas of the membrane thereby. A typical opening time of 500 ms is obtained and a complete opening is stabilized by keeping the heating as long as 1 s or 2 s. The opening of the valve can be observed by monitoring the downstream pressure rising as shown in FIG. 25.

Figures 26A, 26B:
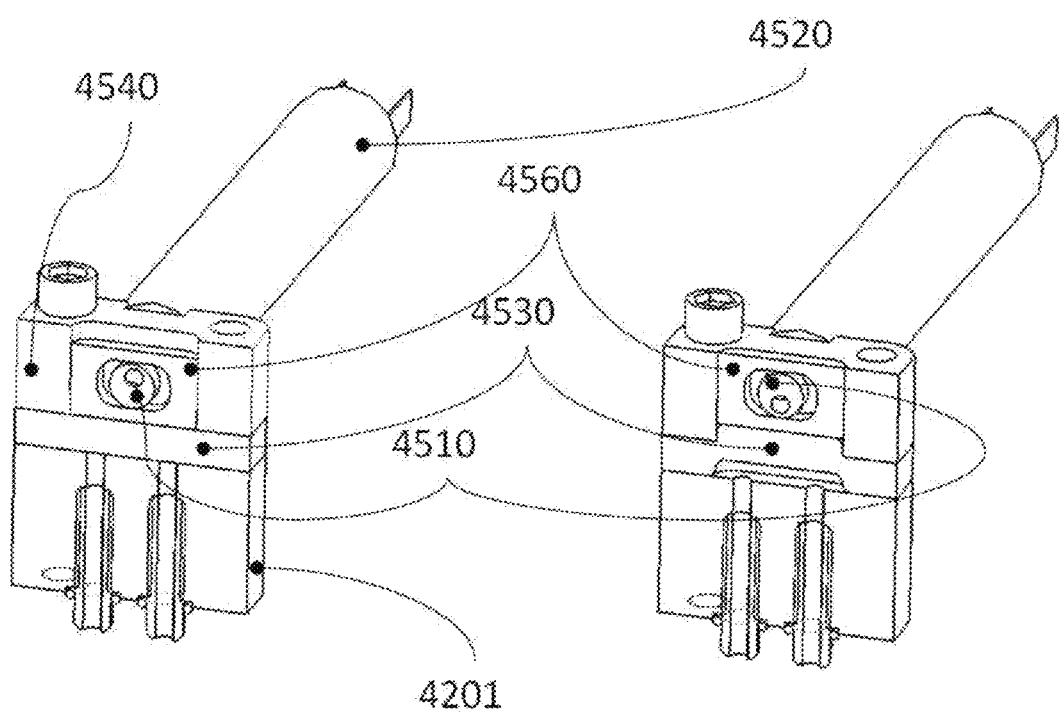
FIGS. 26A and 26B—An isolation valve for multiple uses according to one embodiment of the present invention.

FIGS. 26A and 26B show a multiple actuation valve, here represented as a modification of the previous single actuation "R" isolation valve, is based on a rotating cam 4510 moved by an electric motor which 4520 closes and opens a deformable membrane 4530 placed between body 4201 and head 4540 of the valve. The motor, using a reduction gearbox if necessary, moves a biasing member, in this case a sliding element 4560, by means of the eccentric cam 4510 mounted on its shaft. The sliding element pushes the deformable membrane 4530, possibly made in rubber, which is pressed against the inlet and outlet holes as well as against the flat region between the holes thanks to a tight tolerance assembly. When the sliding element 4560 is lifted due to the cam rotation, the membrane is deformed by the pressure of the fluid from the inlet hole and the fluid starts to flow along the channel created by the deformation of the membrane. The valve is completely opened and closed at each half turn of the cam.

Characteristics of the isolation valve according to various embodiments of the present invention include i. The use of a membrane to interrupt and seal a fluidic channel or pipe to separate a higher pressure side from a lower pressure or empty side
ii. The possible use of a polymeric membrane with one or both sides prepared with glue or sticky material to create a seal between the membrane and the body in contact
iii. The use of one or more resistors to melt such membrane in one or more points so to allow the flow of the fluid through it.
iv. The placement of the resistors with the heating surface at the same level of the surface supporting the sealing membrane.
v. The positioning of the resistors around a hole in the membrane supporting element in order to melt the sealing membrane closing such hole.
vi. The use of a sandwich structure to realize the channel to be sealed in a way transversal to the sandwich layers.
vii. The assembly of the sandwich structure by using soldering material.
viii. The use of the pressure in the pressurized side to press the sealing membrane on the resistor heating surface thereby obtaining the best heat transfer to melt the membrane
ix. The possibility to obtain a returning channel to convey the flow, once the sealing membrane has been opened, back to the same side it was originated, thereby creating the possibility to mount the isolation valve on a side of the tank, for easy replacement in case of re-use or in case of need multiple use for testing purposes.

Pyrotechnic Latch

The pyrotechnic latch 500 can be "protruding pin" or "rotation locked" and is based on a small explosive charge 510 such as a mixture of Potassium Perchlorate and Aluminum powders ignited by a small resistor and displacing a small piston 530 which moves a protruding tip or disengage a rotating element.

The protruding pin latch is a simplified version of the rotation locked which will be described here.

Figures 27A, 27B:
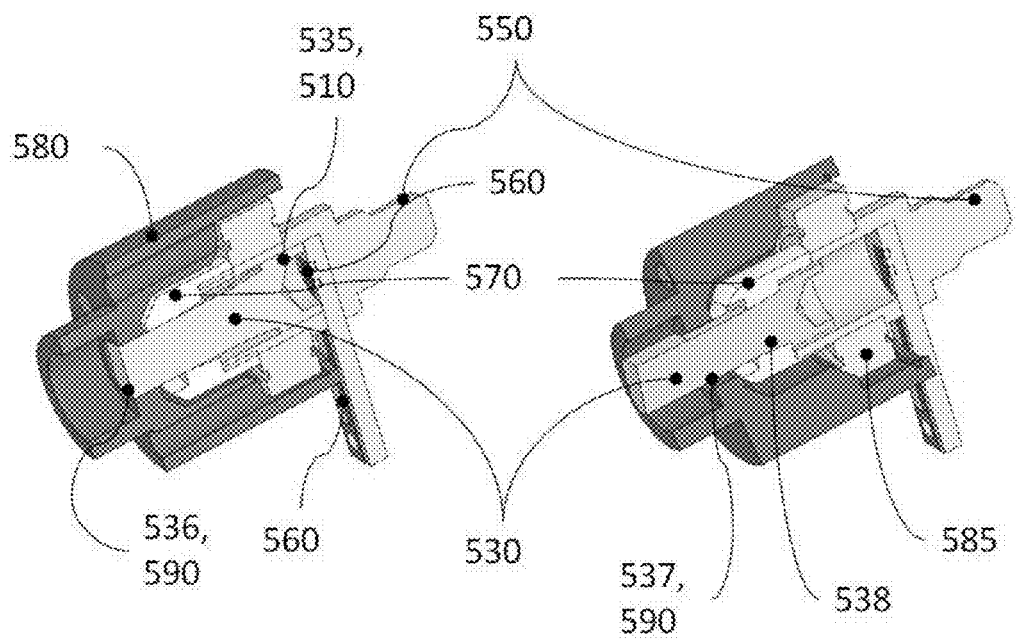
FIGS. 27A and 27B—A Pyrotechnic Latch according to a further embodiment of the present invention.
Figure 28:
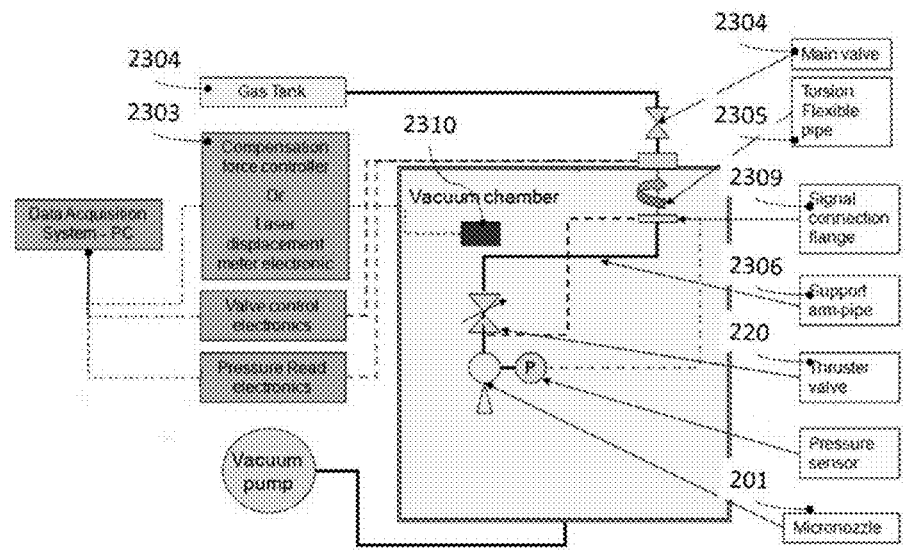
FIG. 28—A Microbalance according to one embodiment of the present invention.
Figures 29A, 29B:
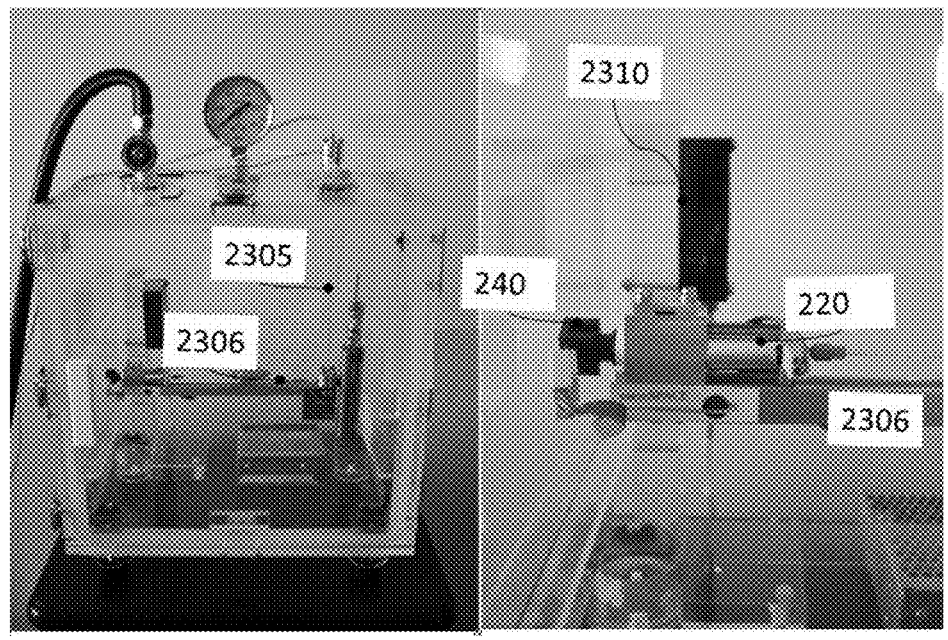
FIGS. 29A and 29B—A Microbalance according to a further embodiment of the present invention.

The latch is mainly composed by a body 550 and a shaft 530, the shaft has a chamber 535 at its inner end and a small Printed Circuit Board (PCB) 560 is inserted from a slot in the body 550 to complete such chamber volume. Such PCB has at least one small resistor 560 facing the chamber volume and connected externally to an electric circuit by means of isolated leads along the PCB. The other end of the shaft has a square section 536 which engages with a retainer element 570 screwed on the body and with the hub 580 attached to the body by means of a bearing 585 or equivalent rotating joint. Retainer and Hub have a rectangular slot 590 that does not allow the relative rotation of shaft, retainer and hub. The chamber is filled with explosive material 510 which is ignited if current passing in the electric circuit heats up the resistor and the adjacent explosive material to the ignition temperature. The resulting explosion pushes the shaft 530 forward as shown in FIG. 27*b* and disengages its square end 536 from the retainer and hub presenting a circular portion 537 to their rectangular slot. At stroke completed the conical mating 538 between shaft and retainer is locked thanks to its small angle. In open configuration the hub is now free to rotate and the shaft is locked in open position.

Microbalance for Thrust Measurements

The thrust measurements have been realized by means of a new microbalance, based on the concept of torsion balance and modified by using a hollow pipe 2305 to supply the pressurized propulsion fluid from an external tank 2304 and to provide the elastic element sensing the thrust force whose deformation is measured at the tip of the arm 2306 where the thrust is produced by the thruster 201. The elastic torsion suspension removes the presence of any friction therefore allowing, in combination with an optocoupling circuit or radio to actuate the thruster valve 220, the measure of the exact force produced by the microthruster. If the optocoupler is not used, very thin conductors attached to a flange 2309 can be added to the system and the small additional stiffness introduced can be numerically deducted by the measurement of the oscillation period with and without such wires. Alternatively the valve can be placed upstream the elastic pipe loosing the capability to create very small thrust pulses but allowing for perfect elastic suspension.

There are two measurement methods possible: by allowing deflection which is then detected 2310 by optical means (i.e. laser displacement meter) or by compensating the thrust with another external and contactless reference and controlled force produced electrically (i.e. electromagnetic or electrostatic force).

The realization of the balance requires a perfect equilibrium of the various suspended masses in order to place the center of mass exactly below the hollow pipe 2305. Furthermore, the pipe must be of very small diameter and thickness to allow for the smallest thrust forces to generate enough deflection force and in the same time, the pipe 2305 must be strong enough to suspend the whole oscillating part and to withstand the gas internal pressure.

The pipe 2305 is connected to the upper and lower flanges by means of glue, the upper flange is connected by means of a screw on the ceiling of the vacuum chamber in which the thrust is measured, and the lower flange is connected by screws to the lower flange that hold the balance arm and the equilibrium counterweight.

Figure 30:
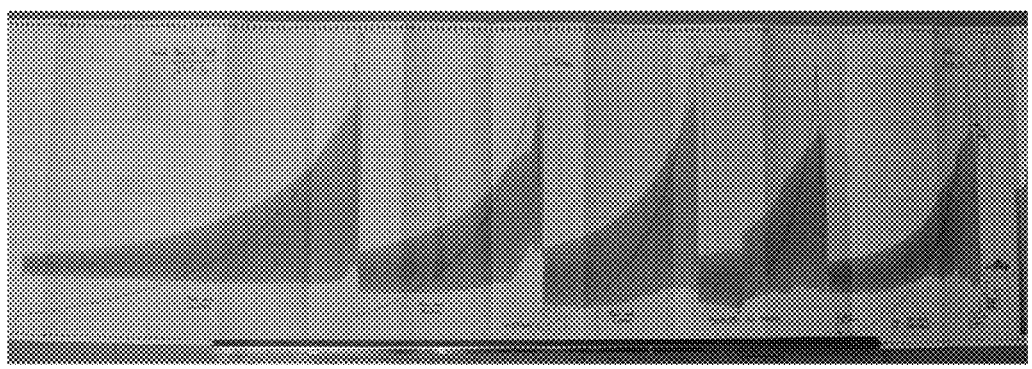
FIG. 30—A characteristic of thrust versus time for various level of heating power for one embodiment of the present invention.

When the balance is operated by switching on the microthruster at the end of its arm, the force produced by the micronozzle 201 turns the arm 2306 around the suspension pipe 2305 and a dynamic oscillation starts according to the difference between thrust-torque and elastic reaction torque of the pipe. Since such two forces are generally not equal, the balance continues its forced harmonic oscillation which is measured by the laser sensor and since the elastic reaction produced by the suspending pipe 2305 is well known due to the material and geometry of the pipe 2305 and since the inertia of the balance is known by design and confirmed by free harmonic oscillation period measurements, the only unknown is the force produced by the micronozzle which can be therefore calculated versus time. For the case of the propellant heating microthruster configuration, a set of typical diagrams of such oscillations is shown by the red line in the FIG. 30 which also shows on the blue line the pressure in the gas tank. Due to the use of a paper recorder, the time direction in the diagrams is from right to left. It can be clearly noticed how the oscillation amplitude (and therefore the thrust of the micronozzle) are reducing as the pressure is reduced by the use of the gas available in the tank.

Magnetic Levitation Bearing for Full Micropropulsion System Characterization

In order to test the complete micropropulsion system it is necessary to operate it in a vacuum box with a suspension that presents the smallest possible friction. Although the following description relates to the solution of such problem for the case of the micropropulsion, the present solution to such problematic can be applied to any instrument or device which includes a rotating equipment of relatively high weight in relation to its rotational friction.

Figure 31:
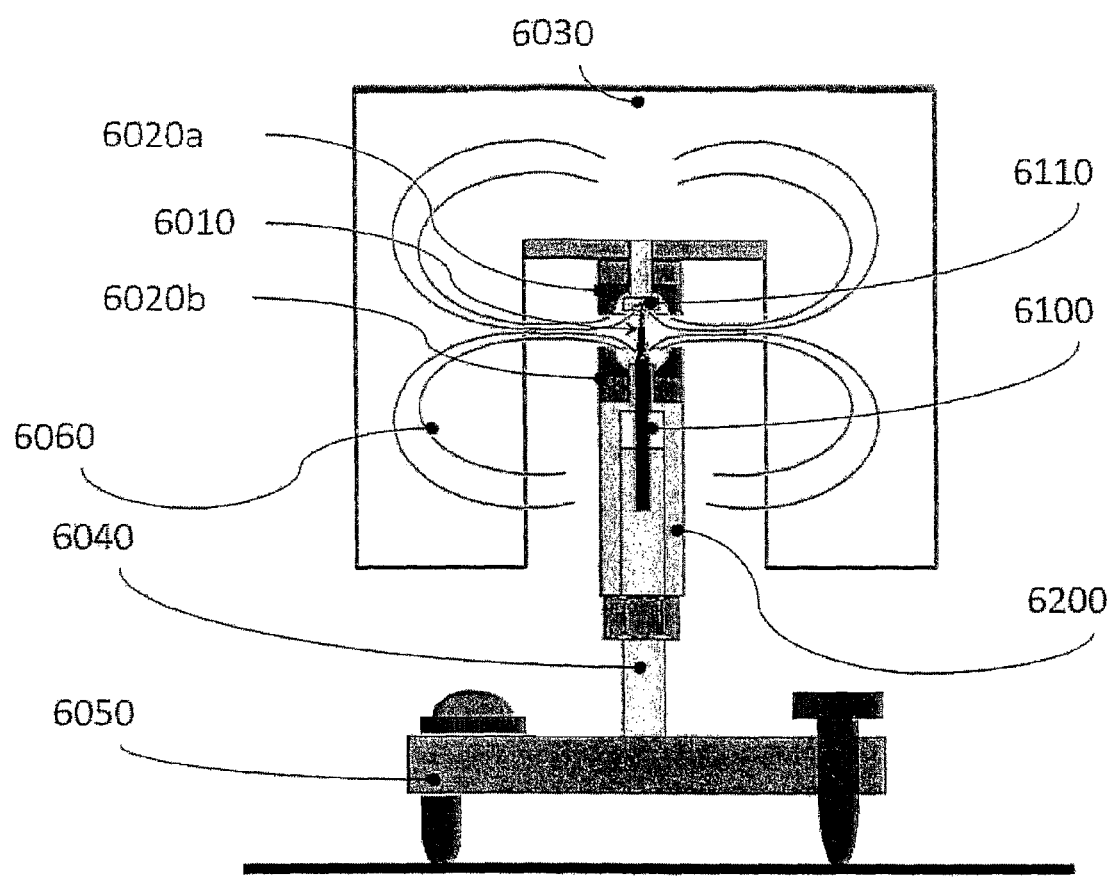
FIG. 31—A Magnetic levitation bearing according to one embodiment of the present invention.

FIG. 31 shows a support apparatus to achieve this which, in this embodiment, includes two ring magnets with axial magnetization in relative rotational engagement, said magnet consequently forming a magnetic levitation bearing. It will be appreciated that in some embodiments, such as when rotational friction is less critical, that the ring magnets may be replaced by a circular array of magnet sections, which may emulate a complete ring magnet.

Such bearing is placed in closest proximity and slightly higher than the center of gravity 6010 of the complete micropropulsion system assembled with the microsatellite components necessary for wireless control and telemetry as well as power supply. The bearing is realized by two ring magnets 6020a and 6020b with axial polarization and opposite polarity with typical magnetic field lines 6060. One bearing is fixed on the levitating micropropulsion structure 6030 while the other is on top of a column 6040 reaching inside the microsatellite and fixed on a base 6050 capable of precise vertical alignment by means of adjustment screws and leveling bubble. Since two opposite magnets do not form a perfectly stable system it is necessary to guarantee a lateral alignment of the two repulsive forces and the gravity force. This is achieved by means of a needle 6100 protruding from one of the two parts (i.e. the column) and engaging a concave seat 6110 in the other part (i.e. the levitating object such as the microsatellite under testing). The distance between the two magnets is kept by the needle-seat at a value insufficient to generate a force that completely balances the weight of the levitating body. In this way there is still a small force keeping the needle 6100 in the center of the seat 6110 and therefore anchoring the two parts together in a stable way. Since such residual force can be selectively reduced by fine tuning the magnet distance thanks to a sliding support 6200, also the friction can be reduced at minimal values also for very heavy levitating masses. By means of this system small lateral oscillations around the contact point needle-seat are allowed which are useful to judge the alignment of the thrusters and distribution of masses.

Having a very low friction compared with any classical bearing, the smallest effects of the microthruster forces can be evaluated and the actual resolution and impulse capability of the micropropulsion system can be fully characterized and demonstrated.

The invention claimed is:

1. A spacecraft comprising:
 a propulsion module for at least one of moving and pointing said spacecraft; and
 a chamber comprising:
  an optical system for transmission of light from an image target to an optical sensor, the optical system comprising at least a window disposed at an end of the chamber, the window being for transmission therethrough of light from the image target; and
 wherein the chamber is configured to act as a fuel chamber for storage of propulsion fuel for the spacecraft.

2. The spacecraft according to claim 1 arranged for the chamber to contain liquid fuel, the chamber further comprising a bellow for containing the liquid fuel, the bellow being arranged to contract as the liquid fuel is consumed, wherein the bellow is terminated by a flat transparent window.

3. The spacecraft according to claim 1 wherein the chamber is of selectively variable volume such that on depletion of said fuel, the chamber is correspondingly reduced in volume.

4. The spacecraft according to claim 3 wherein the chamber comprises a piston for reducing the volume within the chamber.

5. The spacecraft according to claim 1 wherein the chamber comprises an extendable structure to move a first group of lenses forward so as to increase an optical length of the optical system.

6. The spacecraft according to claim 5 wherein the chamber includes at least two concentric portions in sliding engagement and an actuator to cause relative movement between said at least two portions between a retracted position and an extended position.

7. The spacecraft according to claim 1, wherein said chamber includes a deformable supporting structure such that variation of propellant refractive index due to changes in pressure and temperature are compensated for by deforming to a shape to cancel optical effects due to the fuel supply.

* * * * *